(12) United States Patent
Braghin et al.

(10) Patent No.: US 9,870,381 B2
(45) Date of Patent: Jan. 16, 2018

(54) DETECTING QUASI-IDENTIFIERS IN DATASETS

(71) Applicant: International Business Machines Corporation, Armonk, NY (US)

(72) Inventors: Stefano Braghin, Dublin (IE); Aris Gkoulalas-Divanis, Dublin (IE); Michael Wurst, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 14/719,663

(22) Filed: May 22, 2015

(65) Prior Publication Data

US 2016/0342636 A1 Nov. 24, 2016

(51) Int. Cl.
*G06F 17/30* (2006.01)
*G06F 9/50* (2006.01)

(52) U.S. Cl.
CPC ...... *G06F 17/30321* (2013.01); *G06F 9/5005* (2013.01); *G06F 9/5055* (2013.01)

(58) Field of Classification Search
None
See application file for complete search history.

(56) References Cited

U.S. PATENT DOCUMENTS

| | | | |
|---|---|---|---|
| 7,925,678 B2 | 4/2011 | Botros et al. | |
| 7,953,766 B2 | 5/2011 | Gong et al. | |
| 8,429,758 B2 | 4/2013 | Chen et al. | |
| 8,661,423 B2 | 2/2014 | Agrawal et al. | |
| 8,812,524 B2 | 8/2014 | Chen et al. | |
| 2007/0233711 A1 | 10/2007 | Aggarwal et al. | |
| 2010/0332537 A1* | 12/2010 | El Emam | G06F 21/6254 707/771 |
| 2014/0123304 A1 | 5/2014 | Rachlin et al. | |
| 2014/0130178 A1 | 5/2014 | Agrawal et al. | |
| 2014/0189858 A1 | 7/2014 | Chen et al. | |
| 2014/0304244 A1* | 10/2014 | Toyoda | G06F 21/6254 707/696 |
| 2015/0033356 A1* | 1/2015 | Takenouchi | H04L 63/0407 726/26 |

FOREIGN PATENT DOCUMENTS

WO 0137097 A1 5/2001

OTHER PUBLICATIONS

Braghin, et al., "Detecting Quasi-Identifiers in Datasets", U.S. Appl. No. 15/193,536, filed Jun. 27, 2016.

(Continued)

*Primary Examiner* — Anh Tai Tran
(74) *Attorney, Agent, or Firm* — Stosch Sabo

(57) ABSTRACT

Quasi-identifiers (QIDs) are detected in a dataset using a set of computing tasks. The dataset has a plurality of records and a set of attributes. An index is generated for the dataset. The index has an indicator for each attribute value of each record in the dataset. Each indicator specifies all the records in the dataset having the same value for the attribute. Each task is assigned an attribute combination and a subset of the plurality of records in the dataset and is passed to a thread for execution on computing resources. The executing task inspects the set of records specified by the index indicator for each attribute value in the attribute combination to produce a result. The result of at least one task identifies a unique record for the associated attribute combination. The attribute combination producing the unique record is a QID.

10 Claims, 8 Drawing Sheets

(56) References Cited

OTHER PUBLICATIONS

List of IBM Patents or Patent Applications Treated as Related, Jun. 24, 2016. 2 pages.

Cagliero et al., "Infrequent Weighted Itemset Mining Using Frequent Pattern Growth," IEEE Transactions on Knowledge and Data Engineering, vol. 26, No. 4, Apr. 2014, pp. 903-915.

Dong et al., "Mining Infrequent Itemsets based on Multiple Level Minimum Supports," © 2007 IEEE, 0-7695-2882-1/07, 4 pgs.

Gupta et al., "Minimally Infrequent Itemset Mining using Pattern-Growth Paradigm and Residual Trees," International Conference on Management of Data (COMAD), 2011, pp. 1-14.

Haglin et al., "Factors affecting the performance of parallel mining of miminal unique itemsets on diverse architectures," Concurrency and Computation: Practice and Experience, Concurrency Computat.: Pract. Exper. 2009, Published online Feb. 11, 2009 in Wiley InterScience (www.interscience.wiley.com). DOI: 10.1002/cpe.1379, © 2009 John Wiley & Sons, Ltd., pp. 1131-158.

Khare, S. "A Review on Infrequent Weighted Itemset Mining using Frequent Pattern Growth," International Journal of Computer Science and Information Technologies (IJCSIT), vol. 5(2), 2014, pp. 1642-1647, ISSN: 0975-9646.

Samuels, S. "A Bayesian, Species-Sampling-Inspired Approach to the Uniques Problem in Microdata Disclosure Risk Assessment," Journal of Official Statistics, vol. 14, No. 4, 1998, pp. 373-383.

Takemura et al., "Evaluation of per-record identification risk and swappability of records in a microdata set via decomposable models," Graduate School of Information Science and Technology, University of Tokyo, Mar. 2006, 12 pgs.

Yiapanis et al., "Variable-grain and Dynamic Work Generation for Minimal Unique Itemset Mining," 2008 IEEE International Conference on Cluster Computing, 978-1-4244-2640-9/08, © 2008 IEEE, pp. 33-41.

Yiapanis, P. "Parallel Mining of Minimal Sample Unique Itemsets," a dissertation submitted to the University of Manchester for the degree of MSc in Software Engineering in the Faculty of Engineering and Physical Sciences, School of Computer Science, Year of Submission 2006-2007, 142 pgs.

Demchuk et al., "A Fast Minimal Infrequent Itemset Mining Algorithm," ACM Transactions on Knowledge Discovery from Data, vol. V, No. N, Article A, A:1-A:24. Oct. 16, 2014. 24 pages.

Han et al., "Mining Top-K Frequent Closed Patterns without Minimum Support," 2002 IEEE International Conference of Data Mining, Dec. 9-12, 2002. Maebashi City, Japan. 8 pages.

* cited by examiner

| Row ID | R | B | G | Z | M |
|---|---|---|---|---|---|
| 0. | {0, 1, 2, 3} | {0, 1, 6, 7} | {0, 1, 6, 7} | {0, 3} | {0, 1} |
| 1. | {0, 1, 2, 3} | {0, 1, 6, 7} | {0, 1, 6, 7} | {1, 2, 4, 5, 8, 9} | {0, 1} |
| 2. | {0, 1, 2, 3} | {2, 3} | {2, 3, 4, 5, 8, 9} | {1, 2, 4, 5, 8, 9} | {2} |
| 3. | {0, 1, 2, 3} | {2, 3} | {2, 3, 4, 5, 8, 9} | {0, 3} | {3, 4, 5, 6, 7} |
| 4. | {4, 5, 6, 7} | {4, 5} | {2, 3, 4, 5, 8, 9} | {1, 2, 4, 5, 8, 9} | {3, 4, 5, 6, 7} |
| 5. | {4, 5, 6, 7} | {4, 5} | {2, 3, 4, 5, 8, 9} | {1, 2, 4, 5, 8, 9} | {3, 4, 5, 6, 7} |
| 6. | {4, 5, 6, 7} | {0, 1, 6, 7} | {0, 1, 6, 7} | {7, 8} | {3, 4, 5, 6, 7} |
| 7. | {4, 5, 6, 7} | {0, 1, 6, 7} | {0, 1, 6, 7} | {7, 8} | {3, 4, 5, 6, 7} |
| 8. | {8, 9} | {8, 9} | {2, 3, 4, 5, 8, 9} | {1, 2, 4, 5, 8, 9} | {8, 9} |
| 9. | {8, 9} | {8, 9} | {2, 3, 4, 5, 8, 9} | {1, 2, 4, 5, 8, 9} | {8, 9} |

DETECTING QUASI-IDENTIFIERS IN DATASETS

BACKGROUND

The present invention relates to computer processing systems, and more specifically, to a method for identifying combinations of attributes that contain unique records in a dataset.

The identification of attributes (columns) or sets of attributes that can be used to uniquely identify records is a key task in database management as well as in technical systems, in which records consist of a combination of attributes that could hold information about entities, events and others. For example, by combining different columns of a dataset comprising information about events in several nuclear facilities, it may be possible to uniquely identify one of the facilities, which would then allow an observer to group all events to this facility and to draw conclusions about the operations of that facility. Such combinations of attributes that contain values which uniquely point to records from the dataset are called quasi-identifiers (QIDs).

The task of finding unique records aims at discovering combinations of attributes that form QIDs. Such QIDs may be used as input for data anonymization algorithms.

SUMMARY

Disclosed herein are embodiments of a method, system, and computer program product for detecting quasi-identifiers (QIDs) in a dataset using a set of computing tasks. The dataset has a plurality of records and a set of attributes. Each record in the dataset has a value for each attribute.

An index is generated for the dataset. The index has an indicator for each attribute value of each record in the dataset, therefore each indicator is associated with a particular attribute of a particular record. Each indicator specifies all the records in the dataset having the same value for the attribute as the particular record. In other words, if the set of records specified by the indicator includes a certain record, then that record has the same value for the attribute as the particular record associated with the indicator.

Each task is assigned an attribute combination and a subset of the plurality of records in the dataset. Each attribute combination includes one or more of the attributes in the dataset. The task is then passed to a thread for execution on computing resources. The executing task inspects the set of records specified by the index indicator for each attribute value in the attribute combination for at least a portion of the subset of records in the dataset to produce a result, for example by using set operations. The result of at least one task identifies a unique record for the associated attribute combination. For example, to be a unique record for the combination of attribute A and attribute B, no other record in the dataset appears in both sets of records specified by the index indicators for attribute A and attribute B associated with the unique record. In other words, the attribute values in the attribute combination for the unique record are different from the attribute values in the same attribute combination for all other records in the dataset. The attribute combination producing the unique record is a QID.

In some embodiments, finding the unique record occurs after processing a prior attribute combination and finding no QID. In some embodiments, finding the unique record occurs after processing a prior subset of the plurality of records in the dataset and finding no QID.

In some embodiments, generating the index comprises generating a second index for each attribute. Each second index comprises a tree structure having a hierarchical set of nodes, one node for each distinct attribute value of the attribute. Each node specifies a second set of records, where each record in the second set has the same value for the attribute. Then, for each distinct attribute value of each record, the tree structure is traversed to locate the node corresponding to the value. The index indicator for that attribute value is then caused to specify the second set of records associated with the located node. In some embodiments, only the final (first) index is retained on the computing resources; the original dataset and the interim (second) indexes are deleted after the final index is generated to conserve resources.

In some embodiments, an index generator generates the indexes, and a main thread assigns attribute combinations and subsets of records to each task and passes each task to at least one thread for execution on the computing resources.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
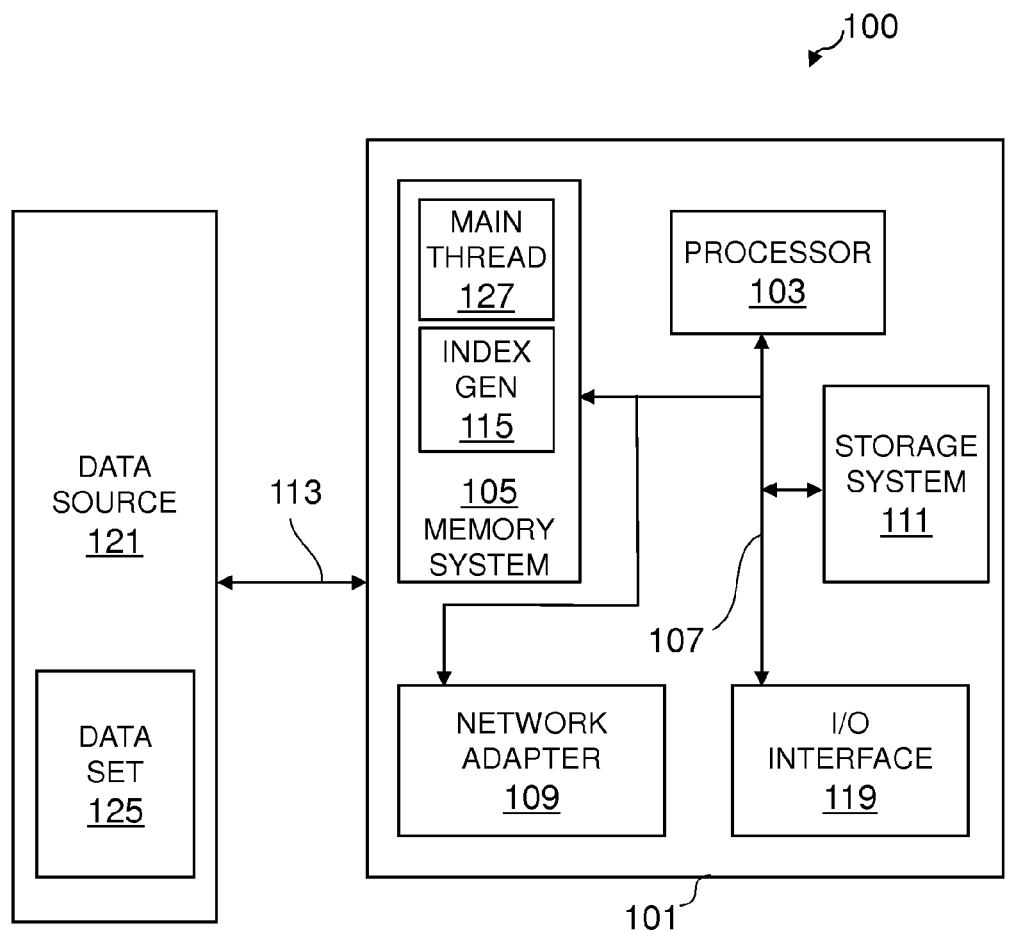
FIG. 1 depicts an example architecture of a system for detecting QIDs in a dataset.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Disclosed herein are embodiments for detecting QIDs in a dataset that creates an inverted index structure of the dataset before starting to identify attribute combinations (sets of columns). This approach may allow for efficient parallel computation of uniques using a breadth-first-search (BFS) visit strategy, where nodes of a lattice of attribute combinations are visited level-wise. This is in contrast to algorithms which work either sequentially, or parallelize the process using a depth-first-search (DFS) visit strategy, which may lead to poor performance. The BFS-strategy may decrease the computational and memory costs of computing QIDs, while fully utilizing the multi-threading capabilities of modern, inexpensive CPUs.

One key application area of at least part of the disclosed embodiments is the anonymization of datasets. An example would be a user that wants to share information about events in several nuclear facilities. To ensure that this sensitive information is protected, the user may remove the name and the ID of each facility, such that events cannot be directly associated with any individual facility. However, by combining different attributes (columns) of the shared information, it may still be possible for an intruder to uniquely identify one of the facilities, which would then allow the intruder to group all events to this facility and to draw conclusions about the operations. Data anonymization algorithms (e.g., k-anonymity, l-diversity, etc., approaches) require the specification of QIDs (e.g., sets of columns in a relational table that may be used by attackers to re-identify individuals through triangulation attacks with external—or personally owned—datasets). A popular example of a QID is the combination of attributes "date-of-birth", "gender", and "5-digit zip code", which has been proven to enable the unique re-identification of approximately 87% of citizens for which such combination of attributes is initially generated.

The term "task" as used herein refers to an action to be performed, such as the scan of records in a dataset for a specified attribute combination in order to identify at least one unique record. The task may be created as a logic program or set of instructions for realizing an intended function. For example, a task may comprise an XML file that indicates the set of instructions.

The term "thread" or "worker thread" as used herein refers to a software thread. The term "software thread" refers to sequences of instructions, such as executable units, which can be executed on a processor, such as a Central Processing Unit (CPU), of a computing device.

The term "attribute" refers to a specification that defines a property of an object, element, or file. Each attribute is associated with a column of a table or a database. In other terms, an attribute's equivalent may be called a column such that "column" and "attribute" may be used interchangeably. The term "attribute combination" refers to a combination of one or more attributes.

The terms "record", "row", and "line" may be used interchangeably. The term "record" refers to a set of related data fields or attributes written as a single contiguous entity to an external storage device.

The QIDs may be determined using the attribute combinations containing identified unique records. For example, a QID comprises an attribute combination containing at least one identified unique record. In other terms, by identifying unique records the QIDs are determined. Following the example of FIGS. 5A-D, the attribute combination of "Gender" and "ZIP" may provide a QID.

The above features may have the advantage of decreasing the computational and memory costs of identifying unique records, while fully utilizing the multi-threading capabilities e.g. of modern inexpensive CPUs. For example, the present disclosure may reduce the processing time required to identify unique records in a dataset. This may save processing resources that would otherwise be required for the additional processing time required by a conventional method. The additional processing time may, for example, be due to the processing of attribute combinations in sequential (non-parallel) order, or attribute combinations that contain attributes having already identified unique records. This is avoided by the present disclosure. This may particularly be advantageous in case of huge datasets e.g. Big data. The present disclosure may run on a reduced data sample (e.g. the first index) compared to a conventional method that runs on the entire dataset. This may save resources (e.g. storage and CPU) and further reduce the processing time.

The present disclosure may have another advantage of enabling a more secure access to datasets, compared to conventional methods, by timely providing the identified unique records that can be subsequently used to avoid malicious access to the datasets.

The passing step d) comprises performing the set of tasks using the associated threads.

According to one embodiment, each task of the set of tasks is associated with a set of records having the attribute combination of the task, wherein the passing (named step d) comprises for each task of the set of tasks: in case of identifying the at least one unique record in the set of records, associated with the task stopping the thread to which the task is passed, otherwise repeating step d) using another set of records that is associated with the task until processing all records of the attribute combination of the task. The expression "a record has an attribute combination" or "a record of an attribute combination" means that the record belongs to the one or more columns comprising values of the attribute combinations. Stopping the thread comprises preventing the thread from further processing other records, and maintaining the thread in a re-use mode until a next task is received by the thread.

This embodiment may have the advantage of further reducing the processing time because if a unique record is found in a previously processed set of records of a given attribute combination, there is no need to run on the rest of records of that attribute combination. Further, splitting the dataset into multiple sets of records and processing them separately may be faster than running on all the records of the dataset at once, in particular for huge datasets. For the same reasons as mentioned above, this embodiment may enable a more secure access to datasets.

According to one embodiment, step d) (i.e. the passing step) further comprises, in case of identifying the record, discarding tasks of the set of tasks associated with an attribute combination also containing the attribute combination having the identified unique record. Discarding tasks comprises stopping execution of the threads to which said tasks have been passed.

This embodiment may particularly be advantageous in case the first set of attribute combinations may comprise combinations of different first numbers of attributes e.g. one attribute and two attributes. For example, the time required to process a single attribute may require less time than processing a combination of two attributes. Thus, if a unique value is identified in a single attribute it may most likely be that tasks associated with the combinations of two attributes (or even one attribute) are still running By stopping threads that execute such tasks as described in this embodiment processing resources may thus further be saved.

According to one embodiment, the disclosure further comprises grouping the set of tasks according to their associated first number of attributes into one or more subsets of tasks, wherein each task of the subset of tasks is associated with the same first number of attributes; ranking the one or more subsets of tasks using the associated first number of attributes; sequentially executing the one or more subset of tasks using the threads in accordance with the ranking, wherein executing the subset of tasks comprises executing in parallel the tasks of said subset of tasks.

According to one embodiment, the disclosure further comprises: in case of identifying the unique record while executing one of the subset of tasks, discarding, from the non-executed subset of tasks, tasks associated with an attribute combination comprising the attribute combination having the identified unique record.

These embodiments may have the advantage of providing an efficient and controlled execution of the unique record identification, in particular, in case of a system having a limited amount of processing resources. For example, in case the computer system provides a limited number of cores that is sufficient to run a subset of tasks, there is no need to generate bigger sets of tasks, as they may not fully be processed.

According to one embodiment, the disclosure further comprises maintaining a single copy of each distinct attribute value in the dataset, wherein the indication for each record in the first index points to the maintained single copy. The single copy of the distinct attribute value may be stored in the memory of the computer system. This embodiment may have the advantage of saving of storage space by storing only required data. Further, the dataset may be deleted and only the first index may be maintained. This may further save storage space.

According to one embodiment, creating the first index comprises: creating a second index for each attribute of the set of attributes, each second index having all distinct attribute values of the respective attribute and indicating all records associated with each distinct attribute values; wherein creating the second index comprises for each attribute of the set of attributes: sequentially reading each record of the dataset having a value of the attribute, for each distinct attribute value creating a node, wherein the node indicates the distinct attribute value; assigning to the node after each reading of a record an indication of the record in case the record comprises the distinct attribute value; and providing the second index as a hierarchy tree structure comprising the created nodes ranked according to the time of creating each node; wherein creating the first index comprises traversing the hierarchy structure.

According to one embodiment, the number of attribute combinations of the first set of attribute combinations is determined using available processing resources in the computer system. For example, the number of attribute combinations of the first set of attribute combinations may be smaller or equal to the number of worker threads provided by the computer system. This may provide an efficient usage of processing resources.

According to one embodiment, the set of tasks run in parallel. The set of tasks are executed in parallel using the threads. This embodiment may have the advantage of further reducing the processing time of the present disclosure.

According to one embodiment, the predefined threshold comprises the number of attributes in the set of attributes. Since the threshold comprises the number of attributes in the set of attributes, all possible attribute combinations may be processed and thus this embodiment may provide an accurate and reliable method for identifying unique records.

According to one embodiment, step d) comprises for each task of the set of tasks: upon identifying a first unique record stopping the thread to which the task is passed. For example, this embodiment does not try to find all unique records of a given attribute combination, but instead it discovers the minimal combinations of columns that contain values pointing to a single unique record. This may be (by definition) sufficient for specifying QIDs, as even if a single record is exposed to re-identification attacks this record needs to be protected. Moreover, this strategy may reduce the size of the output produced by the present disclosure by outputting only the first unique records.

FIG. 1 depicts an exemplary architecture of a data processing system 100 according to an embodiment of the disclosure. The data processing system 100 may for example comprise an IBM InfoSphere Information Server.

The data processing system 100 provides a computer device 101. The components of computer device 101 may include, but are not limited to, one or more processors or processing units 103, a storage system 111, a memory system 105, and a bus 107 that couples various system components including memory system 105 to processor 103. Memory system 105 may include computer system readable media in the form of volatile memory, such as random access memory (RAM) and/or cache memory.

Computer device 101 typically includes a variety of computer system readable media. Such media may be any available media that is accessible by computer device 101, and it includes both volatile and non-volatile media, removable and non-removable media.

Computer device 101 may also communicate with one or more external devices such as a keyboard, a pointing device, a display, etc.; one or more devices that enable a user to interact with computer device 101; and/or any devices (e.g., network card, modem, etc.) that enable computer device 101 to communicate with one or more other computing devices. Such communication can occur via I/O interface(s) 119. Still yet, computer device 101 can communicate with one or more networks such as a local area network (LAN), a general wide area network (WAN), and/or a public network (e.g., the Internet) via network adapter 109. As depicted, network adapter 109 communicates with the other components of computer device 101 via bus 107.

Processor 103 may comprise one or more cores. Each of the one or more cores may be multi-threaded e.g. each core includes three threads or worker threads. This may provide a multi-threaded computing environment.

Memory system 105 is configured to store a plurality of applications that are executable on the processor 103. For example, the memory system 105 may comprise an operating system as well as application programs (e.g. the index generator 115).

Computer device 101 may be connected to a data source 121. The connection to the data source 121 may be via a wired connection or via a network 113, which may be a public network, such as the Internet, a private network, such as a wide area network (WAN), or a combination thereof.

The data source 121 may for example comprise a database system for storing a dataset 125. The dataset 125 may comprise a plurality of records having a set of attributes.

The data source 121 is shown as a separate component of the computer device 101. However, in an exemplary embodiment the data source 121 may be part of the computer device 101. For example, the dataset 125 may be stored in the memory system 105. In another exemplary embodiment, while performing the present methods the dataset 125 may be loaded from the data source 121 and temporarily stored in the memory system 105.

Memory system 105 may be configured to store a main application or main thread 127 that comprises instructions that when executed on the processor 103 may cause the processor to perform at least part of the methods described herein.

The operation of the data processing system 100 will be described in details with reference to FIGS. 2-5.

Figure 2:
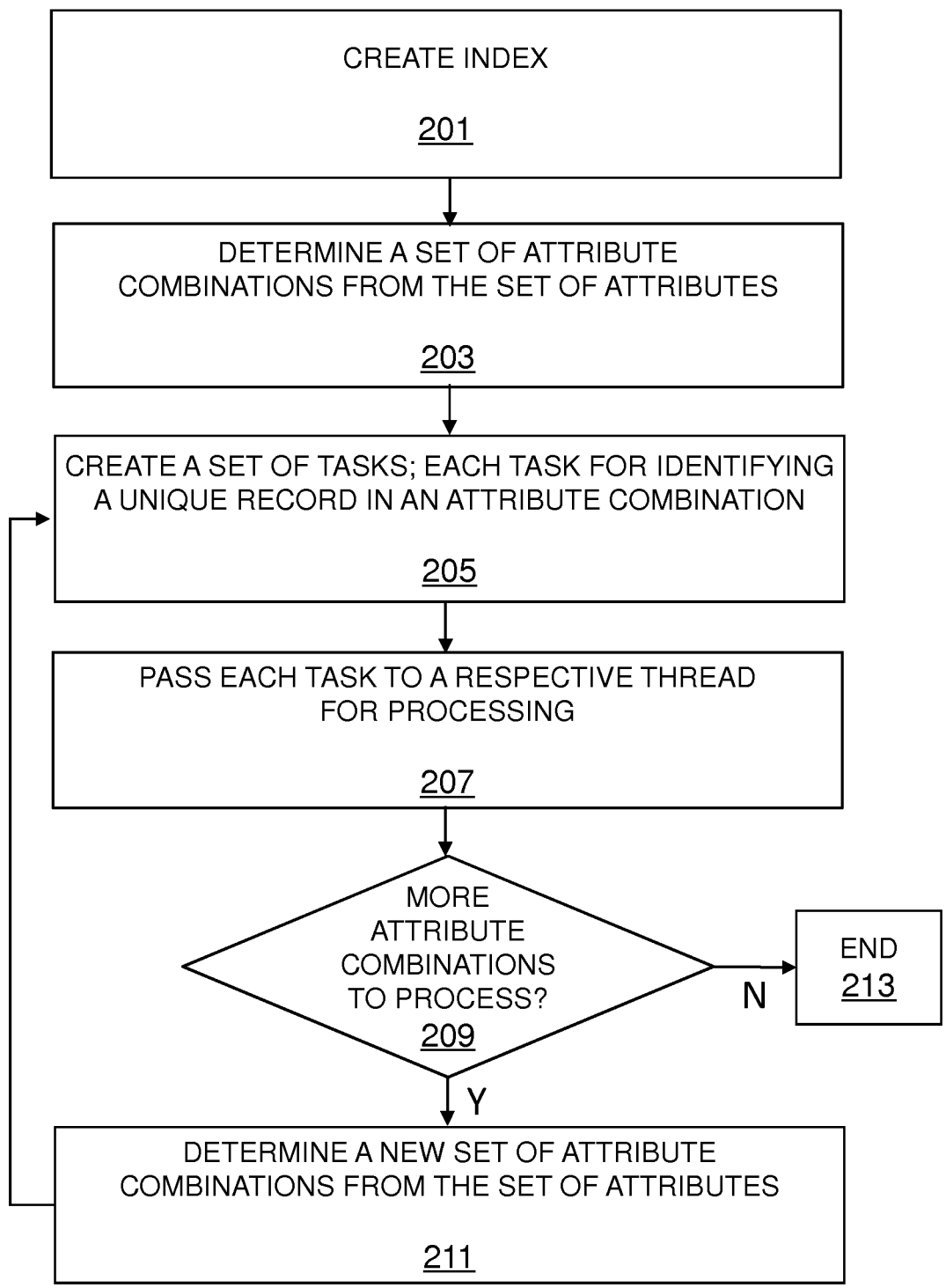
FIG. 2 depicts a flowchart of an example method for detecting QIDs in a dataset.

FIG. 2 depicts a flowchart of a computer-implemented method for detecting a unique record in a dataset e.g. dataset 125. The dataset comprises a plurality of records having a set of attributes. As shown with reference to FIG. 5A, a record may comprise, for example, a line or row of table 601. That record may comprise values of respective attributes. For example, if the dataset 125 comprises two attributes, a record of the dataset may comprise at least two values, each associated with the respective attribute of the two attributes. A unique record comprises a unique value or unique combination of values in at least one attribute of the dataset. For example, the unique combination of values may comprise two or more values of respective two or more attributes of the dataset 125.

In step 201, a first index may be created (e.g. by the index generator) for each attribute of the set of attributes. The first index indicates for each record which other records contain a same distinct attribute value as the record. For example, the first index (e.g. as shown with reference to dataset 631) may be created such that for each value in the dataset there is a pointer pointing to a bucket containing an indication of records having that value.

Figure 5A:
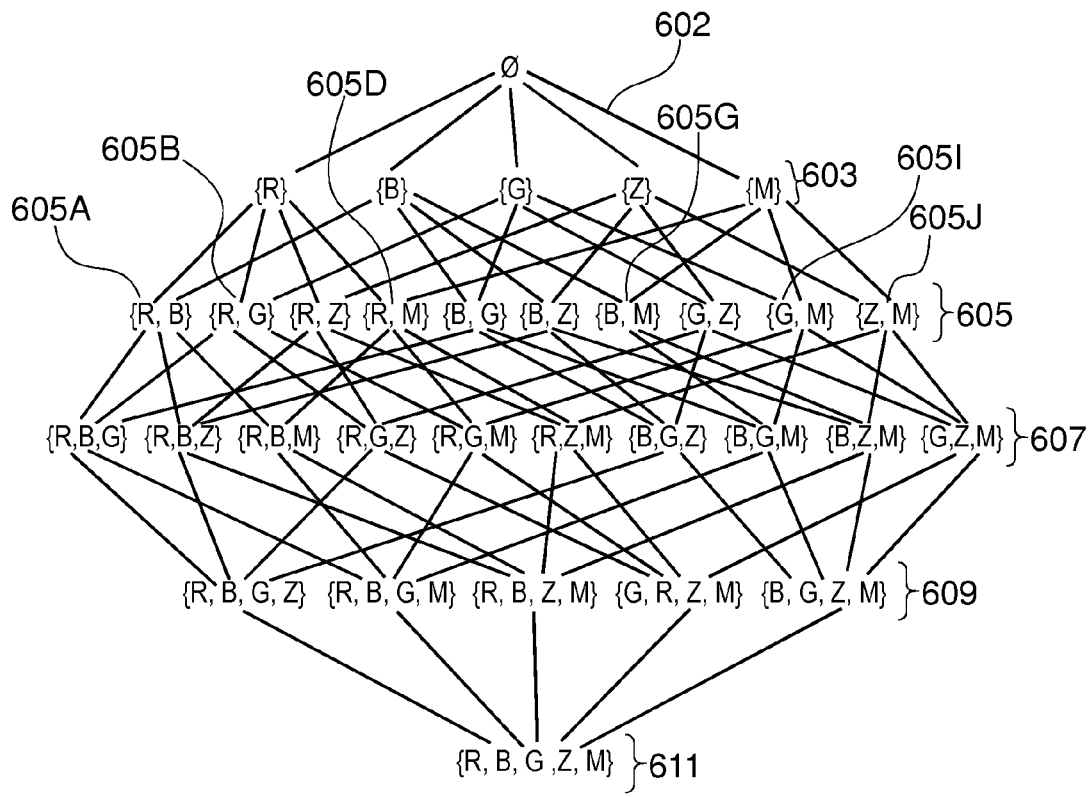
FIGS. 5A, 5B, 5C, and 5D depict the execution flow of an example method for detecting QIDs in a dataset.

For example, attribute "Gender" of dataset 601 of FIG. 5A has 10 gender values, two of which, namely "Female" and "Male" are distinct attribute values. For this attribute, each of the attribute values will be replaced by a pointer to the associated bucket, which leads to multiple pointers pointing to the same bucket, e.g. each attribute value "Male" will be replaced by a pointer P1 to the same bucket indicating rows or records 2, 3, 4, 5, 8 and 9 c.f. table 631 (e.g. the pointer P1 appears 6 times in the created first index).

The first index may, for example, be created or determined by reading the content of the records of each attribute and filling a data structure such as a vector of container elements (e.g. buckets). The first index may be defined in C++ programming language as a std::vector<std::set<row ID>>, wherein the size of the vector is determined by the number of values in the dataset. For example, the first index generated from dataset 601 may be a vector having 50 elements. A detailed example of determining or creating the first index is shown with reference to FIG. 5A-D.

In step 203, a first set of attribute combinations of the set of attributes may be provided. The first set of attribute combinations may be generated on the fly (e.g. at runtime) of the present method. Each attribute combination of the first set of attribute combinations comprises a first number of attributes of the set of attributes.

For example, an attribute combination of the first set of attribute combinations may comprise one or more attributes of the set of attributes (e.g. the first number>=1). Each attribute combination of the first set of attribute combinations may be an attribute combination that is different from other attribute combinations of the first set of attribute combinations. The provision of the first set of attribute combinations results in a set of first numbers because each attribute combination has a first number of attributes. For a given first number, the first set of attribute combinations may comprise at least part of all possible combinations of that first number of attributes of the set of attributes. If the set of first numbers comprises at least two different first numbers e.g. 1 and 2, the first set of attribute combinations may comprise all possible combinations of the lowest first numbers e.g. all possible combinations including one attribute and all possible combinations of two attributes. If the first number is equal to one, and the dataset 125 comprises five attributes, then the all possible combinations comprise five attribute combinations. For example, if a dataset has A attributes (columns), then at most 2^A-1 combinations of attributes may be checked. For example, in a dataset of three columns there are 2^3-1=8-1=7 combinations: a, b, c, ab, ac, bc, abc; three attribute combinations having one attribute and three attribute combinations having two attributes and one attribute combination having three attributes.

In one example embodiment, the set of first numbers comprise a same or different first numbers. The number of attribute combinations in the first set of attribute combinations may be determined based on available processing resources, e.g. in the computer device 101. For example, the number of attribute combinations in the first set of attribute combinations may be equal to the number of worker threads of the computer device 101.

The first set of attribute combinations may temporarily be stored in the memory system 105 e.g. while performing the present method. The first set of attribute combinations may be determined by executing at least part of the main thread 127.

In step 205, a set of tasks may be created, wherein each task is associated with an attribute combination of the first set of attribute combinations. The term "task" refers to an action to be performed on an attribute combination associated with the task. The task may be created as a logic program or set of instructions for realizing an intended function. For example, a task may comprise an XML file that indicates the set of instructions and/or the attribute combination associated with the task. The set of instructions of the task may comprise for each record of the attribute combination associated with the task using or operating the first index in order to identify at least one unique record in that attribute combination.

The set of tasks may be queued or added in a task queue. For example, upon creating a task a request may be made (e.g. by the main thread 127) such that the task be added to the task queue.

In step 207, each task of the set of tasks may be passed to a respective thread. For example, the thread may be newly created for passing the task to that created thread. For example, the main thread 127 may delegate the processing of a task to a separate independent thread by passing that task to the thread. In another example, the task may automatically be passed to the thread e.g. the thread may be configured to request or to retrieve the task e.g. from the task queue. The thread is then responsible for the processing associated with the task. If, for example, a task represents some unit of work that needs to be done, then the thread represents the actual performance of that task. A thread can, for example, be considered to be a running instance of the received task.

Upon passing the task to the thread (e.g. the thread receives the task), the task may be executed by that thread. In another example, the set of tasks may be executed in series such that the set of tasks may be passed to at least one single thread.

In another example, the thread to which the task is passed (e.g. the thread that has received the task) may be selected from a predefined set of threads. The predefined set of threads may be provided as a pool of threads. The pool of threads (also referred to as the pool) may comprise a group or container of pre-instantiated, idle threads which stand ready to receive or to retrieve a task. This type of threads may be preferred over instantiating new threads for each task, in particular, when there is a large number of tasks (e.g. short tasks) to be done rather than a small number of tasks (e.g. long tasks). This may prevent having to incur the overhead of creating a thread a large number of times since threads in the pool are reused rather than created from scratch each time. Another advantage may be that the pool of threads may be suitable for cases where the relative order of the tasks is irrelevant, provided they all get done. In particular, in the present method if the attribute combinations of the first set of attribute combinations has the same first number then the relative order of the tasks associated with these attribute combinations may be irrelevant. In another advantage, the pool of threads may serve to limit the total number of active threads in the system e.g. computer device 101, which reduces the memory and computing burdens.

For example, when the pool receives a task (e.g. from the main thread 127) or retrieves a task from the task queue, the pool selects a thread from the container or waits for one to become available if the container is empty, hands or passes that thread a task. This causes the idle thread to resume execution, invoking e.g. an execute( )method for executing the task that the thread received. Once execution is complete, the thread is back to the pool to be put into the container for re-use, in sleep mode until a next task is received. The task queue may or may not be part of the pool. The access to or retrieval of the tasks from the task queue may for example be performed on a first-in, first-out (FIFO) basis.

The execution of the set of tasks may, for example, be performed in parallel by the threads to which the set of tasks are passed or assigned.

For example, as soon as a unique record is detected or identified by a given thread, that thread stops execution and may send a message indicating the identified unique record to the main thread 127. In addition or alternatively, a soon as the task is executed (i.e. finished) by a thread, the thread may send a message to the main thread 127 indicating the completion of the execution of the task. The given thread may then be reused again in case the given thread is part of the pool of threads. In another example, a dummy task (e.g. a stop task) may be added as the last task to the task queue for each thread. As soon as the dummy task is passed to a thread, that thread may be configured to send a message to the main thread indicating that the thread processed the last task. The thread may then be killed (e.g. cannot be reused) after the dummy task has been passed to the thread. This may save resources that would otherwise be required by threads waiting for new tasks. This may also be particularly advantageous in case of a sequential execution of the tasks of the task queue as the main thread 127 may be informed that the set of tasks are completely executed.

If no more attribute combinations remain to be processed at 209, the method ends at 213. If more attribute combinations remain to be processed at 209, then a new set of attribute combinations may be determined at 211. For example, if the maximum of the set of first numbers (i.e. the highest number among the set of first numbers) is smaller than a predefined threshold, then steps 205, 207, and 209 may be repeated using a second set of attribute combinations of the set of attributes determined at 211. Inquiry 209 may be performed as soon as the set of tasks associated with the first set of attribute combinations are executed i.e. completed. For example, the second set of attribute combinations may only be performed if the first set of attribute combinations does not contain all possible combinations of the attributes of the dataset. In other terms, the second set of attribute combinations may, for example, be created if the highest number of the set of first numbers is smaller than the number of attributes in the dataset. This is because a combination containing all the attributes of the dataset may be used to identify unique records. The second set of attribute combinations may be created or provided such that it contains attribute combinations different from the attribute combination of the first set of attribute combinations.

Each attribute combination of the second set of attribute combinations may comprise a second number of attributes of the set of attributes. The second number is higher than or equal to the maximum of the set of first numbers. The second number may be equal to the first highest number of the first set of first numbers if the attribute combinations having that maximum number of attributes are not all possible combinations. Referring to FIG. 5A, if, for example, the first set of attribute combinations comprises the attribute combinations 603 and attribute combinations 605A-605B, then in this case not all the attribute combinations having two attributes i.e. 605 are part of the first set of attribute combinations and thus the second set of attribute combinations may comprise the remaining combinations of the set of attribute combinations 605.

Figure 5B:
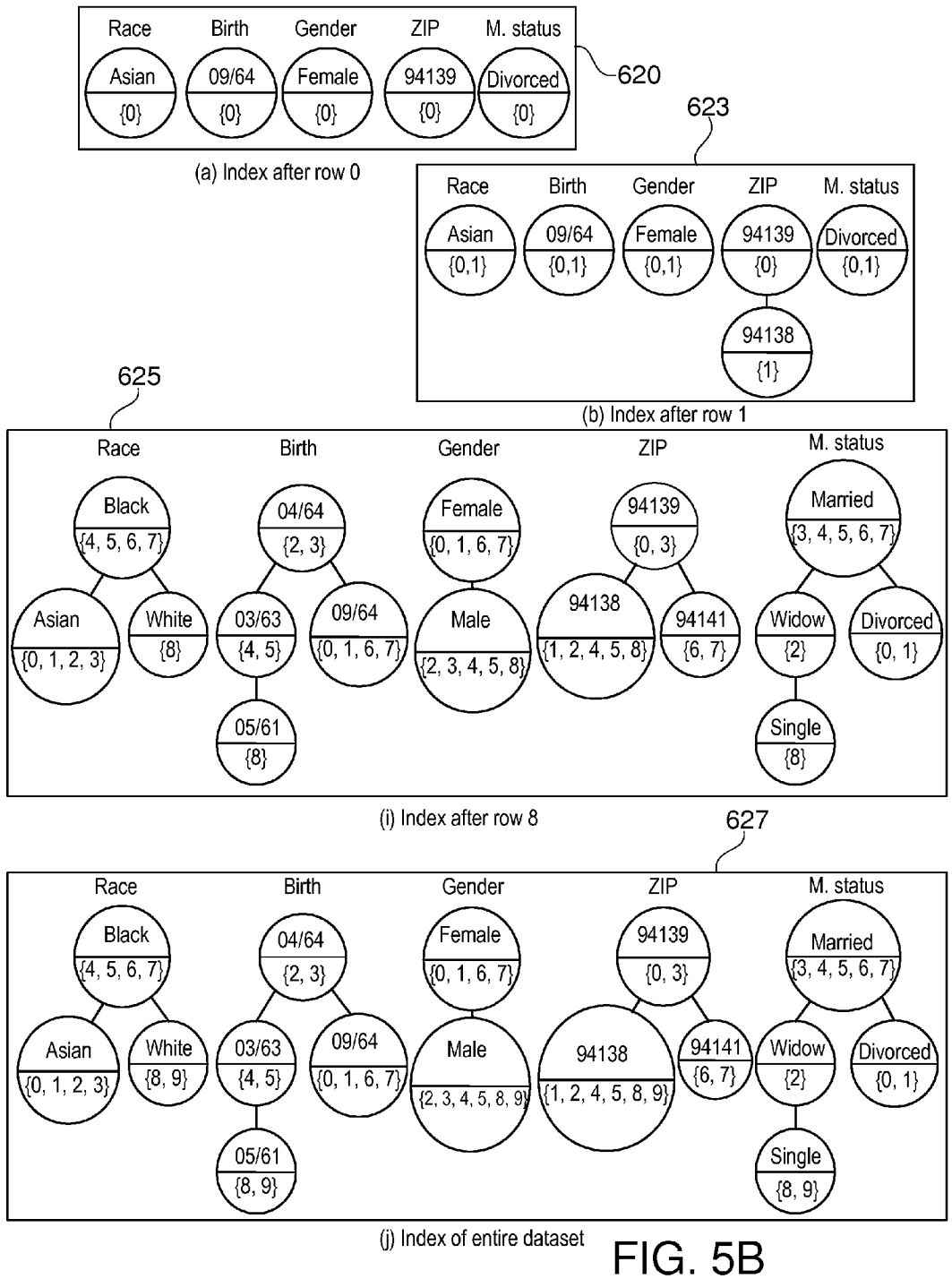
Figure 5C:
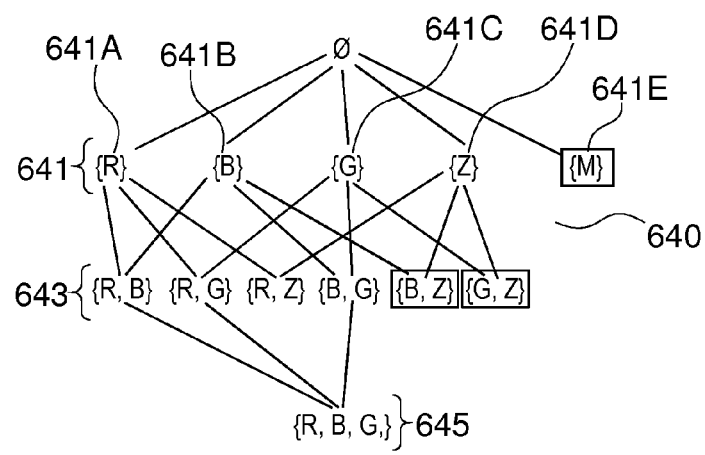

The second set of attribute combinations excludes attribute combinations containing identified unique records. Referring, for example, to FIG. 5C the attribute combination 641E in the first set of attribute combinations comprises a unique record and thus the attribute 641E is excluded from attribute combinations 643.

Figure 3:
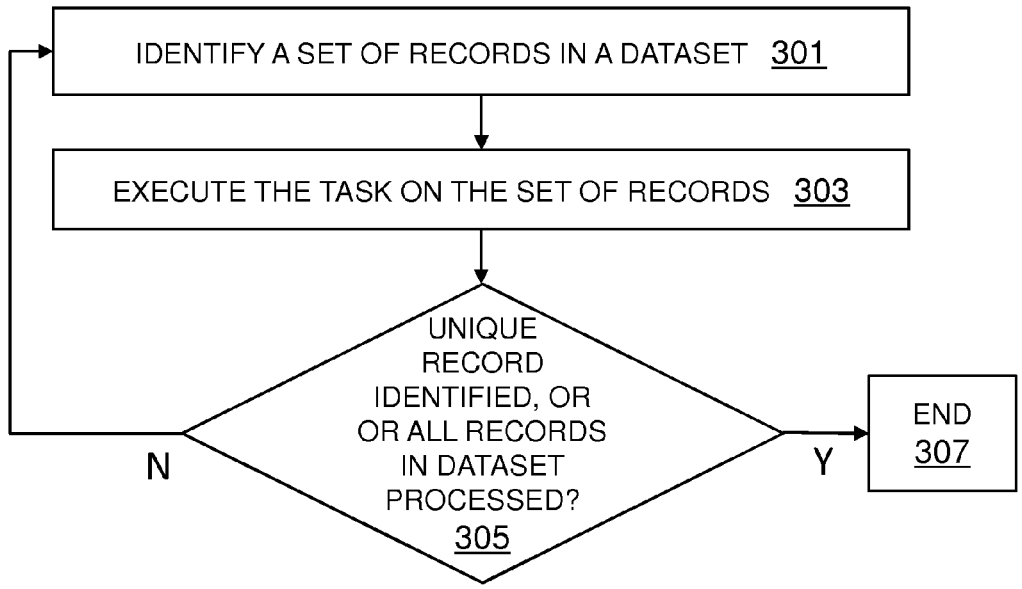
FIG. 3 depicts a flowchart of an example method for passing a task to a thread in detecting a unique record in a dataset.

FIG. 3 depicts a flowchart further defining step 207 of FIG. 2. In FIG. 3, each task of the set of tasks is associated (step 301) with a set of records of the attribute combination associated with the task before the task is executed (step 303). The set of records may be user defined or may be automatically selected based on available resources e.g. in the computer device 101. When executing a task of the set of tasks the unique record may be identified in that set of records assigned to that task. In this case, there is no need to further process other remaining set of records of that task and the thread to which that task is assigned may be stopped at 307. If there is no unique records found, it is checked (inquiry 305) whether are remaining records that are not yet processed; if so, steps 301 and 303 may be repeated for identifying at least one unique record in at least part of the remaining records. The repetition is performed until all records of the dataset are processed.

Figure 4:
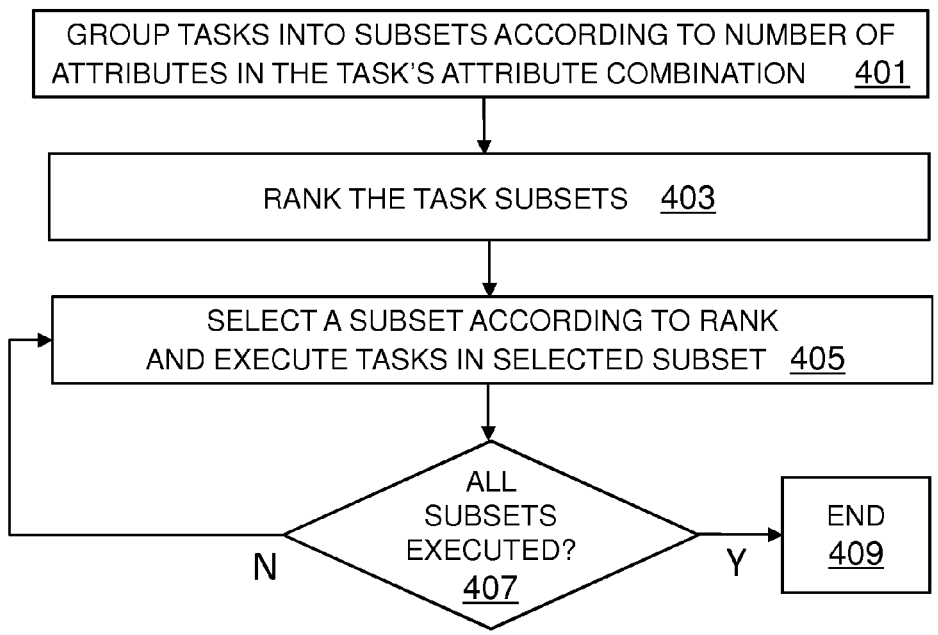
FIG. 4 depicts a flowchart of an example method for executing tasks in QIDs in a dataset.

FIG. 4 depicts a flowchart of a method for executing the set of tasks. In step 401, the set of tasks may be grouped according to their associated first number of attributes into one or more subsets of tasks. Each task of the subset of tasks is associated with the same first number of attributes. With reference to FIG. 5A, if the first set of attribute combinations comprises attribute combinations 603 and 605A-D, then the set of tasks may be grouped into two subsets of tasks. A first subset of tasks comprises tasks associated with attribute combinations 603 having the first number equal to one, while a second subset of tasks comprises tasks associated with attribute combinations 605A-D having the first number equal to two.

In step 403, the one or more subsets of tasks may be ranked using the associated first number of attributes. For example, the subset of tasks may be ranked in ascending order according to the first number of attributes that is associated with each subset of tasks. Following the above example, the first subset of tasks may be ranked first followed by the second subset of tasks.

In step 405, the subset of tasks of the one or more subsets of tasks that is first ranked may be executed by, for example, passing each task of the subset of tasks to a respective thread e.g. of the pool of threads. The executing of the subset of tasks may be performed in parallel using the threads. For example, in case of identifying a unique record while executing the (current) subset of tasks, tasks associated with an attribute combination comprising the attribute combination having the identified unique record may be deleted from non-executed subset of tasks of the one or more subsets of tasks. Following, the above example, upon executing the first subset a unique record may be identified in the attribute combination 641E. Thus, the task associated with the attribute combination 605D may be deleted from the second subset of tasks since the attribute combination 605D contains that attribute combination 641E. The deletion may be performed before executing the second subset of tasks.

It may then be checked (inquiry 407) if there are remaining non executed subset of tasks. If not, the method ends at 409. If so, step 405 may be repeated for a remaining subset of tasks.

FIGS. 5A-D depicts the execution flow of an exemplary method starting from a simplified example of a dataset 601. The dataset 601 comprises five attributes "Race", "Birth", "Gender", "ZIP" and "Marital status" and 10 records numbered according to a Row ID from 0 to 9. FIG. 5A further shows all possible attribute combinations 603-611 that can be generated from the dataset 601: five attribute combinations 603 of one attribute; ten attribute combinations 605 of two attributes; ten attribute combinations 607 of three attributes; five attribute combinations 609 of four attributes; and one attribute combination 611 of five attributes. For example, each of the attribute combinations 603 comprises a single attribute of the dataset 601 e.g. "Race" or "Birth" etc. And, each of the attribute combinations 605 comprises two attributes of the dataset 601 e.g. attribute combination 605A comprises two attributes of the dataset 601, namely "Race" and "Birth".

Using the dataset 601, an initial index structure (referred to as second index above) may be created in order to identify the distinct attribute values and associated records. The initial index structure is first initialized. The initial index structure may comprise, for example, a vector of maps e.g. std::vector<std::map<value, unsigned>>. The keys of the map are defined over the domain of the attribute in the corresponding order. The values of each map is a set of row IDs i.e. records of the dataset 601.

Upon initiating the initial index structure, an iteration over the records of the dataset 601 may be performed in order to process each record as described below. As shown in FIG. 5B, the records are processed sequentially starting from the first record (row 0) to the last record (row 9) of the dataset 601. The processing of a record comprises identifying distinct attribute values in that record. As shown in diagram 620 of FIG. 5B, each distinct attribute value is represented by a respective node. Each node comprises a pointer that refers to a set of row IDs containing the IDs of those rows or records having same distinct attribute value for each given attribute. For example, after processing the first record (row 0), the pointer of the attribute "Race" points to row 0. However, after processing all records i.e. after processing last record (row 9), that pointer points to row IDs 0, 1, 2 and 3 as they all contain the same distinct attribute value "Asian" as shown in diagram 627. In other terms, in one parse of the dataset 601, for each column a map is generated such that it contains distinct attribute values in that column and pointers to the rows where each value of the distinct values appears are maintained.

Subsequently, an iteration over the attributes is performed using the initial index structure as generated above. For each attribute, the corresponding map is retrieved from the initial index structure. Then, the set of row IDs for the value of the attribute in the current row of the dataset 601 is retrieved. This results in another index (e.g. which may be considered as an inverted index generated from the initial index structure and that inverted index may for example be represented by an inverted list linking each column-value or attribute value combination to a set of records that contain this combination.) as shown with reference to data structure 631 of FIG. 5C, which is referred to herein below as result index. For example, each distinct attribute value appearing in a column of data structure 631 corresponds to one memory instance. Thus, there are no duplicates, this way the result index makes an efficient use of main memory e.g. the memory system 105.

Next, a first set of attribute combinations may be created from data structure 631. Assuming, for example, that a number of three threads may be supported by the computer device 101 e.g. in order to be run in parallel. In this case, the number of attribute combinations in the first set of attribute combinations may comprise at least three attribute combinations. The number of attribute combinations in the first set of attribute combinations may be determined based on a multiplier value. The multiplier value may, for example, be in the range [1.5, 2]. The number of the attribute combinations in the first set of attribute combinations is obtained by multiplying the multiplier value by the number of threads i.e. 3. The multiplier value chosen for the present example is 1.5. The selection of the multiplier value may be performed taking into consideration the length of a task that has to process a given attribute combination in the first set of attribute combinations.

Thus, the first set of attribute combinations may comprise attribute combinations 641A-E. The attribute combinations are chosen in an ascendant order i.e. starting from the attribute combination having one attribute, followed by two attributes and so on. The first set of attribute combinations may for example be stored in a list (referred to as AT, 665 of FIG. 5D here), where AT is a list of pairs (as,rb) where as is a combination of attributes and rb is the last analyzed block size (i.e. set of records of data structure 631) for as. In another example, AT may be a list indicating the attribute combinations as only, if all records are processed at once for a given attribute combination as.

Next, a set of tasks may be generated e.g. by the main thread 127, wherein each task may be associated with a respective attribute combination of the first set of attribute combinations. Each task indicates or comprises instructions to use the result index in order to find at least one unique record for the attribute combination associated with the task. For example, a task associated with attribute combination 641A may comprise instructions that when executed (e.g. by a thread of the three worker threads) parse or read values of attribute "R" (or column "R") in data structure 631 in order to find whether there is a set of row IDs that contains a single row ID, which indicates a unique record.

For example, each task may further be associated with a set of records and not all of the records of the data structure 631 e.g. this may be required if there are not enough processing resources in the computer device 101 to process all the records at once. For example, an initial set of records that may be assigned to each task may comprise records having Row IDs 0 to 4 in data structure 631.

Figure 5D:
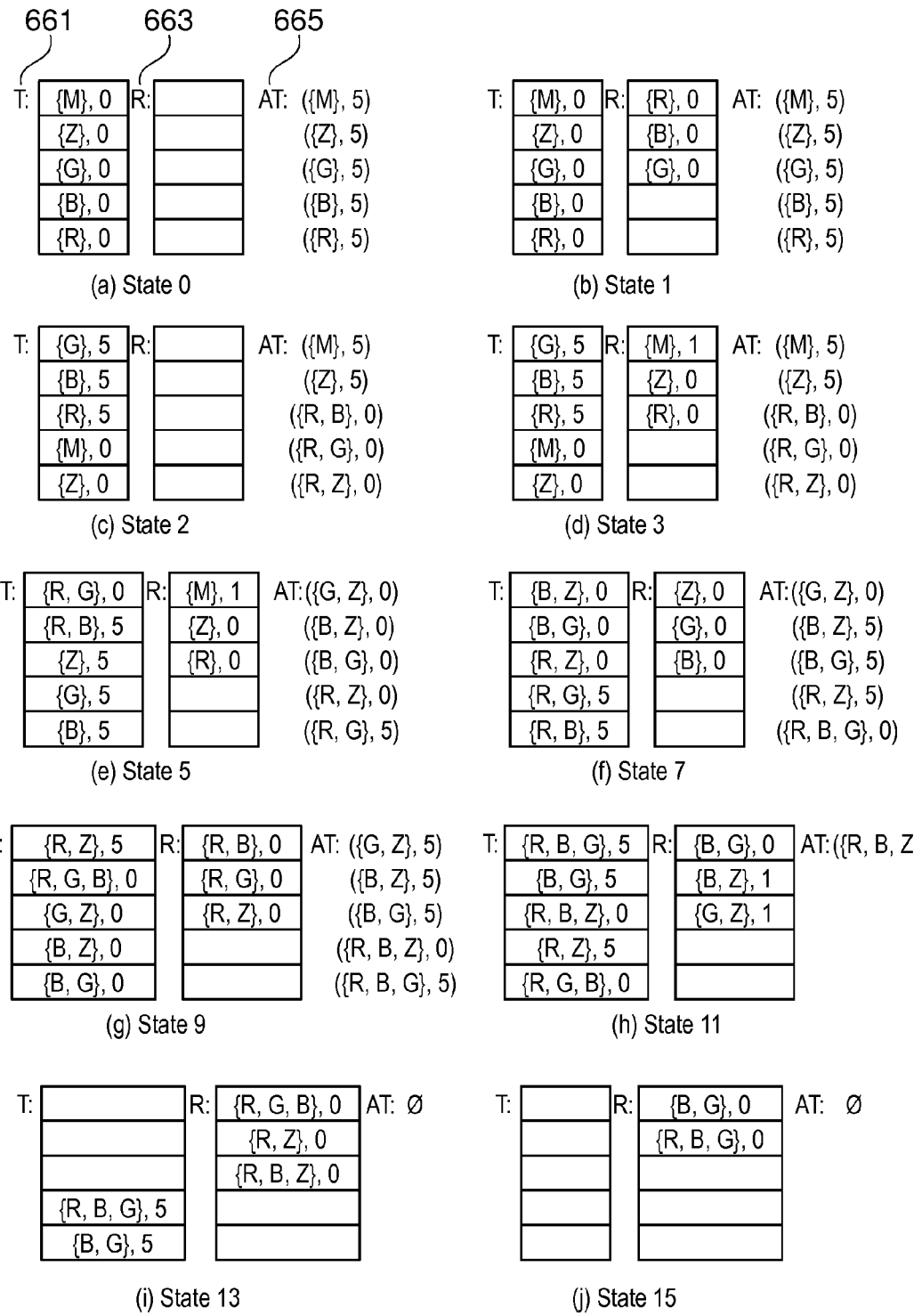

The set of tasks may be added to a task queue 661 as described above with reference to FIG. 2. The tasks that are pushed to the task queue are represented in FIG. 5D as 1. ({R}; k), 2. ({B}; k), 3. ({G}; k), 4. ({Z}; k), 5. ({M}; k), where k is an indicator of the set of records that are associated with the tasks. Different stages of the execution flow are illustrated by "State 0" to "State 15" shown in FIG. 5D. Current or initial state of the execution flow may for example be "State 0" of FIG. 5D where the task queue 661 is shown as containing the set of tasks as generated before, with k=0.

In a second stage, i.e. "State 1" of FIG. 5D, each thread of the three worker threads may receive or retrieve a task of the task queue 661 e.g. in the order in which the tasks are added to the task queue 661. Each thread may identify any unique value in lines 0 to 4. For each of these lines the thread may check whether the corresponding entries of the result index i.e. data structure 631 contain a single (hence unique) element. This may be done for example by verifying the cardinality of the set of row IDs identified by the attribute {R} for record i. Namely, for line 0 the thread may verify that the cardinality of the entry (R; 0) of data structure 631, which is the set {1; 2; 3; 4}, is not 1. Since there are not unique values in the first 5 rows of column "R" of data structure 631, the thread may push a response to a response queue 663, indicating that no unique values have been found for the attribute combination {R} being processed by the associated thread of the three worker threads. Similarly happens with the two other threads and the associated attribute combinations {B} and {G}. The result of this first round of execution is shown in "State 1" of FIG. 5D.

Immediately after a first thread of the three worker threads (or after all three worker threads) pushes a response to the response queue 663 the main thread e.g. 127 may proceed by pushing new tasks to the task queue 661. The new tasks may be associated with the same attribute combinations but with different set of records. The new tasks are represented in "State 2" as ({R}; 5), ({B}; 5), ({G}; 5), where 5 is the value of k indicating that the set of lines or records having Row IDs in data structure 631 5 to 9 have to be processed. After all the threads have responded, the state of the processing flow will be as shown in "State 2" of FIG. 5D. Note that this is an approximation of the actual state as results are removed from the result queue 663 in order to generate new tasks. The main thread goes in a round-robin fashion through the entries of AT 665 which contain the created attribute combinations. For example, AT may be implemented using a std::vector and the next element to be analyzed is identified by an iterator over such vector.

The three worker threads would either retrieve or would be assigned or passed by the main thread 127 three other tasks of the task queue 663 namely tasks represented ({Z}; 0), ({M}; 0) and ({R}; 5). Assume that Thread 1 of the three worker threads is assigned the execution of task ({M}; 0). Thread 1 proceeds as previously shown and verifies if there is at least a unique attribute value of attribute {M} between lines 0 to 4 of data structure 631. Indeed, Thread 1 detects that the cardinality of the record (M; 2) contains a set of cardinality 1, which means that the associated attribute value is unique for the entire dataset 631. Thread 1 immediately pushes its discovery to the result queue 663 with a message indicating the unique attribute value. The other threads, on the other hand, continue their execution as normal not detecting unique attribute-value combination in the tasks assigned to them. The state of the processing flow is represented in "State 3".

Once the main thread retrieves from the result queue the message sent from Thread 1, which indicates the unique attribute value, the main thread proceeds into banning attribute {M}. This means that any set of attributes that is superset of {M} has to be discarded, which leads to the prune of the elements of the lattice 602 which results in lattice 640 of FIG. 5C.

Subsequently, the main thread removes all the entries of AT 665 that are superset of {M}. In this case, only the entry ({M}; 5) is identified as superset of {M}, and is discarded. This leads to the generation of a new set of attribute combinations e.g. {R;B} and to pushing a new task associated to the new attribute combination to the task queue 663. After all the three worker threads have executed their assigned tasks, and before retrieving new ones, the state of the processing flow is as in "State 5".

The execution flows is show in FIG. 5D for the subsequent iterations. When a worker thread receives the task ({B;Z}; 0), cf. "State 9" and subsequent, the worker thread finds that line 0 is a unique combination of attribute values and notifies the main thread 127. Similarly for task ({G;Z}; 0), as line 0 is a unique combination of attribute values (i.e. the combination of the two set of row IDs {0, 1, 6, 7,} and {0, 3} is unique). For example, in case the above two threads have not yet informed the main thread that attribute combinations {B;Z} and {G;Z} contain unique records, tasks ({R;B;Z}; 0) and ({R;G;Z}; 0) may be submitted for execution. Nevertheless, as soon as the worker threads inform of the unique identified in tasks ({B;Z}; 0) and ({G;Z}; 0) the main thread scans AT 665 and removes the entries ({R;B;Z}; 5) and ({R; G;Z}; 5) preventing their execution. Also, the main thread may perform a banning of the item-sets {B;Z} and {G;Z}. By doing this, a further pruning of the search space may be done, leaving only to be explored the elements shown in lattice 640.

After the end of the processing flow the main thread returns the following report: Marital status: 2; Birth, ZIP: 0; Gender, ZIP: 0

The number following each attribute combination refers to the row ID where the first unique value or unique combination of values was found. Based on these results a data anonymization algorithm can decide on how to process the corresponding attribute combinations. For example, the algorithm may decide to process \Marital status" using data masking provider and (\Birth", \ZIP") and (\Gender", \ZIP") using two invocations of a k-anonymization algorithm. A simpler alternative is to consider each attribute returned by the report as a QID attribute, hence k-anonymization will be executed on attributes (\Marital status", \Birth", \Gender", \ZIP").

Figure 6:
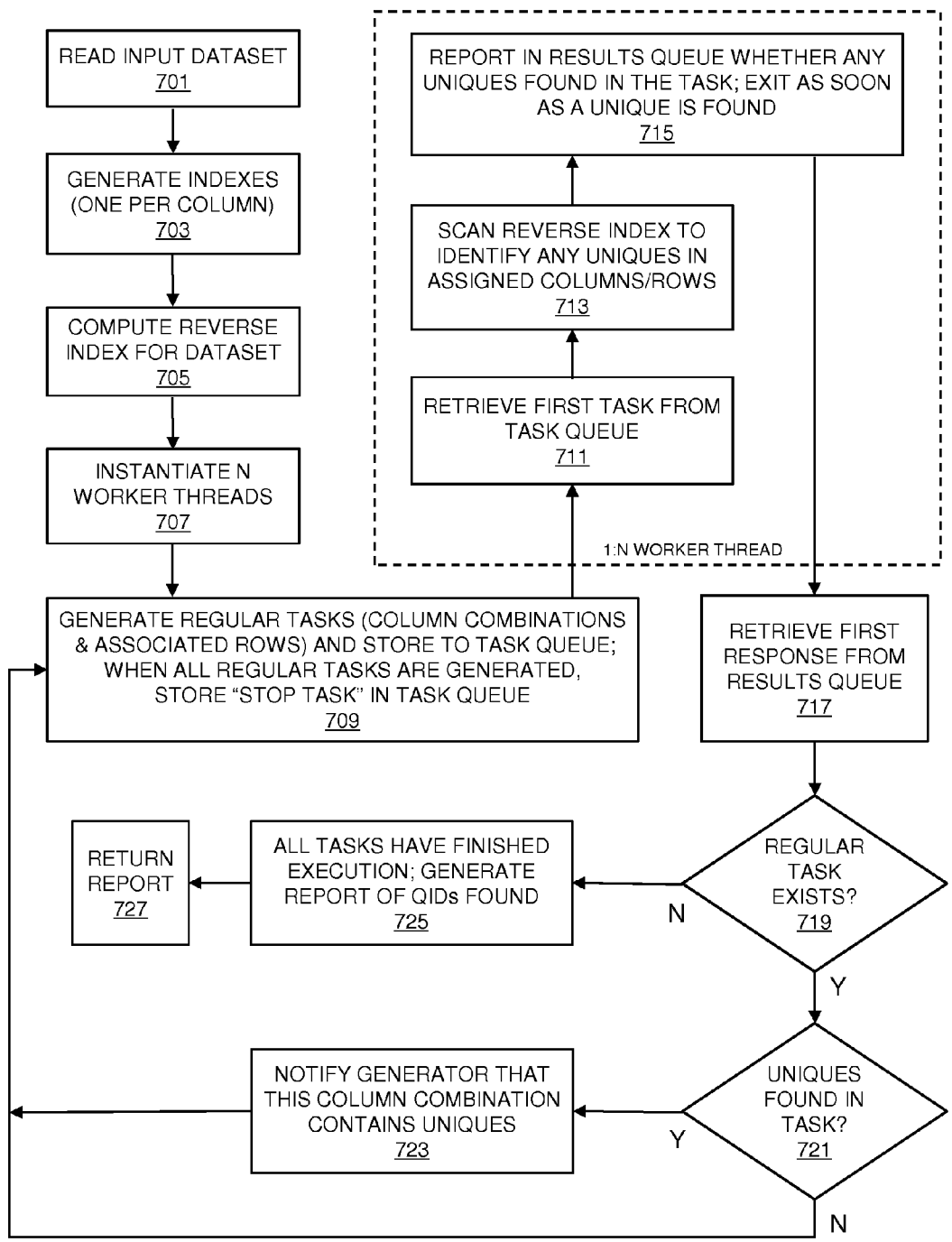
FIG. 6 depicts a flowchart of an example method for detecting QIDs in a dataset.

FIG. 6 illustrates a method for detecting QIDs in a dataset. At 701, the dataset is read and indexes are generated for each column (attribute) at 703. At 705, the reverse index is computed for the dataset. In some embodiments, the reverse index includes a pointer for each attribute value of each record in the dataset. The pointer points to a set of record identifiers, where each record indicated by the set of record identifiers has the same value for the attribute. At 707, a number of worker threads are instantiated. At 709, one or more regular tasks are generated. Each task will operate on a column combination (attribute combination) and a subset of the rows in the dataset. The tasks are stored to a task queue, and when the regular tasks are generated, a "stop task" is stored in the task queue.

For each instantiated thread, a first task in retrieved from the task queue at 711. The reverse index is scanned and any unique records for the associated attribute combination being processed by the task are identified at 713. At 715, results are reported in a results queue. In some embodiments, the thread stops executing the task as soon as a unique record is found. In some embodiments, the threads are processed simultaneously.

At 717, a response is retrieved from the results queue. If regular tasks no longer exist at 719, then all tasks have finished and a report of QIDs found is generated at 725. The report is returned, or provided, at 727. If regular tasks still exist at 719, then the retrieved response is inspected at 721 to determine if any unique records were found by the task for its attribute combination. If so, then the generator is notified at 723 that this attribute combination qualifies as a QID. Any additional regular tasks needed are then generated at 709 and the process is repeated.

Some embodiments provide a computer implemented method for detecting a unique record in a dataset, the unique record comprising a unique value or unique combination of values in at least one attribute of the dataset, the dataset comprising a plurality of records having a set of attributes comprising the at least one attribute, the method comprising: creating a first index for each attribute of the set of attributes, wherein the first index indicates for each record which other records contain a same distinct attribute value as the record; providing a first set of attribute combinations of the set of attributes, each attribute combination of the first set of attribute combinations comprising a first number of the respective attributes of the set of attributes, the provision of the first set of attribute combinations resulting in a set of first numbers; creating a set of tasks, each task associated with an attribute combination of the first set of attribute combinations; passing each task of the set of the tasks to a respective thread to operate on the first index in order to identify at least one unique record in the attribute combination associated with the task; if the maximum of the set of first numbers is smaller than a predefined threshold repeating steps c)-d) using a second set of attribute combinations of the set of attributes, an attribute combination of the second set of attribute combinations comprising a second number of the respective attributes of the set of attributes, wherein the second number is higher or equal to the maximum of the set of first numbers, wherein the second set of attribute combinations excludes attribute combinations containing identified unique records.

In some embodiments, each task of the set of tasks is associated with a set of records having the attribute combination of the task, wherein the passing comprises for each task of the set of tasks: in case of identifying the at least one unique record in the set of records, associated with the task stopping the thread to which the task is passed, otherwise repeating step d) using another set of records that is associated with task until processing all records of the attribute combination of the task.

In some embodiments, step d) further comprises in case of identifying the record discarding tasks of the set of tasks associated with an attribute combination also containing the attribute combination having the identified unique record. In some embodiments, the method further comprises: grouping the set of tasks according to their associated first number of attributes into one or more subsets of tasks, wherein each task of the subset of tasks is associated with the same first number of attributes; ranking the one or more subsets of tasks using the associated first number of attributes; sequentially executing the one or more subset of tasks using the threads in accordance with the ranking, wherein executing the subset of tasks comprises executing in parallel the tasks of said subset of tasks.

In some embodiments, the method further comprises: in case of identifying the unique record while executing one of the subset of tasks, discarding, from the non-executed subset of tasks, tasks associated with an attribute combination comprising the attribute combination having the identified unique record. In some embodiments, the method further comprises: maintaining a single copy of each distinct attribute value in the dataset, wherein the indication for each record in the first index points to the maintained single copy.

In some embodiments, the creating the first index comprises: creating a second index for each attribute of the set of attributes, each second index having all distinct attribute values of the respective attribute and indicating all records associated with each distinct attribute values, wherein creating the second index comprises for each attribute of the set of attributes: sequentially reading each record of the dataset having a value of the attribute, for each distinct attribute value creating a node, wherein the node indicates the distinct attribute value; assigning to the node after each reading of a record an indication of the record in case the record comprises the distinct attribute value; providing the second index as a hierarchy tree structure comprising the created nodes ranked according to the time of creating each node; wherein creating the first index comprises traversing the hierarchy tree structure.

In some embodiments, the number of attribute combinations of the first set of attribute combinations is determined using available processing resources in the computer system that is performing the method. In some embodiments, the predefined threshold comprises the number of attributes in the set of attributes. In some embodiments, step d) comprises for each task of the set of tasks: upon identifying a first unique record stopping the thread to which the task is passed.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for detecting quasi-identifiers in a dataset using a set of computing tasks, the dataset having a plurality of records and further having a set of attributes, each record having an attribute value for each attribute in the set of attributes, the computer program product comprising a computer readable storage medium having program instructions embodied therewith, wherein the computer readable storage medium is not a transitory signal per se, the program instructions executable by a processor to perform a method comprising:
  generating a first index for the dataset, the first index having an index indicator for each attribute value of each record, each index indicator specifying a set of records, the specified set of records including each record in the plurality of records having the same attribute value for the associated attribute as the associated record;

assigning an attribute combination to each task in the set of computing tasks, the attribute combination for each task including one or more attributes of the set of attributes;

assigning a subset of the plurality of records to each task in the set of computing tasks;

detecting at least one quasi-identifier by passing each task to at least one thread for execution on computing resources, the execution of each task comprising inspecting the index indicator for each attribute value in the assigned attribute combination of at least a portion of the assigned subset of the plurality of records to produce a result, the result of at least one task identifying a unique record for the associated attribute combination, the attribute values in the attribute combination for the unique record different from the attribute values in the attribute combination for all other records in the plurality of records, the at least one quasi-identifier being the attribute combination assigned to the at least one task identifying a unique record.

2. The computer program product of claim 1, wherein the method further comprises:

assigning a second attribute combination to each task in the set of computing tasks, the second attribute combination for each task including one or more attributes of the set of attributes, the second attribute combination for each task excluding the detected at least one quasi-identifier;

detecting a second at least one quasi-identifier by second passing each task to the at least one thread for execution on the computing resources, the execution of each task comprising inspecting the index indicator for each attribute value in the assigned second attribute combination of at least a portion of the assigned subset of the plurality of records to produce a second result, the second result of at least one task identifying a unique record for the associated second attribute combination, the second at least one quasi-identifier being the second attribute combination assigned to the at least one task identifying a unique record.

3. The computer program product of claim 1, wherein the detecting the at least one quasi-identifier includes detecting a first quasi-identifier by passing a first task to a first thread for execution on the computing resources, wherein the first quasi-identifier is detected before inspecting the index indicator for each attribute value in the assigned attribute combination of a last portion of the assigned subset of the plurality of records, and wherein the method further comprises:

stopping the first thread upon detecting the first quasi-identifier, the stopping the first thread preventing inspecting the index indicator for each attribute value in the assigned attribute combination of the last portion of the assigned subset.

4. The computer program product of claim 1, wherein each attribute in the set of attributes is represented by a set of distinct attribute values, and wherein the generating the first index for the data set comprises:

generating a second index for each attribute in the set of attributes, each second index comprising a tree structure having a hierarchical set of nodes corresponding to the set of distinct attribute values representing the set of attributes, each node specifying a second set of records, the specified second set of records including each record in the plurality of records having the distinct attribute value corresponding to the node; and for each attribute value in the plurality of records, traversing the tree structure associated with the attribute to locate the node corresponding to the attribute value, and causing the index indicator for the attribute value in the first index to specify the second set of records specified by the located node.

5. A computer system for detecting quasi-identifiers in a dataset using a set of computing tasks, the dataset having a plurality of records and further having a set of attributes, each record having an attribute value for each attribute in the set of attributes, the computer system comprising a processor and a computer readable storage medium storing instructions, wherein the computer readable storage medium is not a transitory signal per se, and wherein the processor executes the instructions to perform a method comprising:

generating a first index for the dataset, the first index having an index indicator for each attribute value of each record, each index indicator specifying a set of records, the specified set of records including each record in the plurality of records having the same attribute value for the associated attribute as the associated record; and assigning, using a main thread, an attribute combination to each task in the set of computing tasks, the attribute combination for each task including one or more attributes of the set of attributes, the main thread further used by the processor to assign a subset of the plurality of records to each task in the set of computing tasks, and the main thread further used by the processor to detect at least one quasi-identifier by passing each task to at least one thread for execution on computing resources, the execution of each task comprising inspecting the index indicator for each attribute value in the assigned attribute combination of at least a portion of the assigned subset of the plurality of records to produce a result, the result of at least one task identifying a unique record for the associated attribute combination, the attribute values in the attribute combination for the unique record different from the attribute values in the attribute combination for all other records in the plurality of records, the at least one quasi-identifier being the attribute combination assigned to the at least one task identifying a unique record.

6. The computer system of claim 5, wherein the main thread is further used by the processor to assign, before the assigning the attribute combination to each task, a prior attribute combination to each task in the set of computing tasks, the prior attribute combination for each task including one or more attributes of the set of attributes, the prior attribute combination for each task different from all attribute combinations, and wherein the main thread is further used by the processor to detect, before the detecting the at least one quasi-identifier, no quasi-identifier by passing each task to the at least one thread for execution on the computing resources, the execution of each task comprising inspecting the index indicator for each attribute value in the assigned prior attribute combination of the assigned subset of the plurality of records to produce a result, the result of each task identifying no unique record for the associated attribute combination.

7. The computer system of claim 5, wherein the main thread is further used by the processor to assign, before the assigning the subset of the plurality of records to each task, a prior subset of the plurality of records to each task in the set of computing tasks, the prior subset of the plurality of records for each task different from all subsets of the plurality of records, and wherein the main thread is further used by the processor to detect, before the detecting the at least one quasi-identifier, no quasi-identifier by passing each task to the at least one thread for execution on the computing resources, the execution of each task comprising inspecting the index indicator for each attribute value in the assigned attribute combination of the assigned prior subset of the plurality of records to produce a result, the result of each task identifying no unique record for the associated attribute combination.

8. The computer system of claim 5, wherein each record has a record identifier, wherein each index indicator is a pointer to a set of record identifiers, wherein a first index indicator for a first attribute of a first record is a first pointer to a first set of record identifiers, wherein a second index indicator for the first attribute of a second record is a second pointer to a second set of record identifiers, and wherein a third index indicator for the first attribute of a third record is the first pointer to the first set of record identifiers, the first set of record identifiers including the record identifier for the first record and further including the record identifier for the third record, the first set of record identifiers not including the record identifier for the second record.

9. The computer system of claim 5, wherein each attribute in the set of attributes is represented by a set of distinct attribute values, wherein the processor is further configured to generate a second index for each attribute in the set of attributes, each second index comprising a tree structure having a hierarchical set of nodes corresponding to the set of distinct attribute values representing the set of attributes, each node specifying a second set of records, the specified second set of records including each record in the plurality of records having the distinct attribute value corresponding to the node, and wherein the processor is further configured to, for each attribute value in the plurality of records, traverse the tree structure associated with the attribute to locate the node corresponding to the attribute value, and cause the index indicator for the attribute value in the first index to specify the second set of records specified by the located node.

10. The computer system of claim 9, wherein the main thread is further used by the processor to store, on a storage system, the generated second index for each attribute on the computing resources, wherein the main thread is further used by the processor to store, on the storage system, the generated first index for the dataset on the computing resources, and wherein the main thread is further used by the processor to, after the storing the generated first index for the dataset and before the passing, delete the generated second index for each attribute from the computing resources, the computer system further comprising:

the storage system.

* * * * *